United States Patent
Schmitt (10) Patent No.: US 8,343,449 B1
(45) Date of Patent: Jan. 1, 2013

(54) DEVICE AND METHOD FOR PRODUCING A TUBULAR REFRACTORY METAL COMPOUND STRUCTURE

(75) Inventor: Jason Schmitt, Wichita, KS (US)

(73) Assignee: Nitride Solutions, Inc., Wichita, KS (US)

( * ) Notice: Subject to any disclaimer, the term of this patent is extended or adjusted under 35 U.S.C. 154(b) by 0 days.

(21) Appl. No.: 13/171,198

(22) Filed: Jun. 28, 2011

Related U.S. Application Data (62) Division of application No. 13/171,036, filed on Jun. 28, 2011.

(51) Int. Cl.
| | |
|---|---|
| C01B 21/06 | (2006.01) |
| C01B 31/34 | (2006.01) |
| C01B 31/30 | (2006.01) |
| C01B 21/076 | (2006.01) |
| C01B 35/04 | (2006.01) |
| C01B 25/08 | (2006.01) |
| C04B 35/52 | (2006.01) |
| C04B 35/00 | (2006.01) |
| C03C 3/00 | (2006.01) |
| C23C 8/00 | (2006.01) |
| C23C 22/00 | (2006.01) |
| C23C 8/24 | (2006.01) |
| C23C 8/06 | (2006.01) |

(52) U.S. Cl. ........ 423/409; 423/440; 423/439; 423/411; 423/297; 423/289; 501/87; 501/96.1; 501/12; 148/209; 148/223; 148/238; 148/281; 148/630

(58) Field of Classification Search .................. None
See application file for complete search history.

(56) References Cited

U.S. PATENT DOCUMENTS

| | | | | |
|---|---|---|---|---|
| 5,399,207 | A | * | 3/1995 | Kemp ............................. 148/209 |
| 5,439,744 | A | * | 8/1995 | Claar et al. ..................... 428/408 |
| 6,013,226 | A | * | 1/2000 | Steel et al. ....................... 419/49 |
| 6,045,628 | A | * | 4/2000 | Solntsev et al. ................ 148/281 |
| 2009/0324859 | A1 | * | 12/2009 | Schlesser et al. ............. 428/34.1 |

* cited by examiner

Primary Examiner — Melvin C Mayes
Assistant Examiner — Guinever Gregorio
(74) Attorney, Agent, or Firm — Polsinelli Shughart PC (57) ABSTRACT

The disclosure provides a device and method used to produce a tubular structure made of a refractory metal compound. In particular, the disclosure provides a device and method used to produce a tubular structure made of a refractory metal compound by reacting a green tubular structure made of a refractory metal with at least one reactive gas.

14 Claims, 5 Drawing Sheets

DEVICE AND METHOD FOR PRODUCING A TUBULAR REFRACTORY METAL COMPOUND STRUCTURE

CROSS REFERENCE TO RELATED APPLICATIONS

This is a divisional application that claims benefit to U.S. Nonprovisional application Ser. No. 13/171,036 entitled "Device and Method for Producing a Tubular Refractory Metal Compound Structure" filed on Jun. 28, 2011 the contents of which are hereby fully incorporated by reference in their entirety.

FIELD OF INVENTION

The present disclosure relates to a device and method used to produce a tubular structure made of a refractory metal compound. In particular, the present disclosure relates to a device and method used to produce a tubular structure made of a refractory metal compound by reacting a green tubular structure made of a refractory metal and at least one reactive gas.

BACKGROUND

High quality single crystals, such as aluminum nitride or zinc oxide, are produced using various high temperature crystal growth techniques. Many of these growth techniques involve heating reactants used to form the crystals at high temperatures for extended time periods. As such, the materials used to construct high-temperature components such as furnace or crucible walls in the reactors used for high temperature crystal growth may be subjected to temperatures in excess of 2000° C. in the presence of reactive gases or plasma. Desired characteristics for these materials may include resistance to outgassing, sublimation, or chemical reactions with crystal growth reactants at high temperatures, ease of fabrication into a variety of shapes, and economic viability for mass production. The materials used in the fabrication of existing high-temperature components may typically possess only one or two of these desired characteristics.

Some materials that may be resistant to chemical attack at elevated temperatures may also be difficult and expensive to machine or shape. For example, tantalum carbide (TaC) is extremely resistant to chemical attack at elevated temperatures and may be produced using two different methods. TaC may be produced from Ta metal by a direct carbonization process, but the relatively low diffusivity of carbon reactants through the tantalum metal produces only a surface coating of TaC. In order to achieve the full conversion of a Ta structure to TaC by direct carbonization, a process time on the order of weeks may be necessary. A TaC component fabricated as a sintered-pressed TaC powder reduces the fabrication costs, but the possible shapes produced by the powder sintering are inherently limited by the process. In addition to fabrication costs, tantalum is relatively expensive compared to tungsten or other high-temperature materials.

There exists a need for an economical method of producing high-temperature components, such as furnace or crucible walls, using affordable materials that are highly resistant to degradation or other chemical reactions at high temperatures. In particular, a need exists in the art for a method of producing high-temperature components by converting a component formed from a relatively easily machined or shaped refractory metal material into a high-temperature component by reacting the refractory metal with one or more reactive gases to form a non-reactive, refractory metal compound that is stable at high temperatures.

SUMMARY

The present disclosure relates to a device and method of producing a component made of a refractory metal compound such as a nitride, carbide, or boride suitable for use as a crucible or a furnace component. The components may be used in a high-temperature single crystal growth process, such as chemical vapor deposition or vaporization/recondensation. The high-temperature component, which can include a tubular structure, may be produced by a process in which a green tubular structure is fabricated from a refractory metal. The green tubular structure is then contacted at high temperature with a reactive gas such as nitrogen, methane, or diborane ($B_2H_6$), which converts the refractory metal into a refractory metal nitride, carbide, or boride, respectively. The inventive device and method promote diffusion of the reactive gases into the refractory metal walls of the tubular structure by creating a pressure gradient across the walls of the tubular structure.

Embodiments of the device provide an open-flow reactor for producing a tubular structure made of a refractory metal compound. The tubular structure is produced by reacting a green tubular structure made of a refractory metal such as zirconium with at least one reactive gas such as methane to convert the refractory metal into a refractory metal compound such as zirconium carbide.

The open-flow reactor includes a support system to hold and seal opposed ends of the green tubular structure within the reactor, and to define a closed internal volume within a lumen of the green tubular structure. The open flow reactor also includes a gas supply system to supply at least one reactive gas such as nitrogen or methane to the internal volume and to an external volume that is contained within the reactor and outside of the internal volume. An exhaust system is also included in the open flow reactor to remove unreacted gas from the internal volume and the external volume within the reactor.

In other embodiments, a continuous-feed open-flow reactor is provided for producing a tubular structure made of a refractory metal compound. In these embodiments, the tubular structure is produced by reacting a series of linear subsections of an elongate green tubular structure formed from a refractory metal with at least one reactive gas. The reactor includes a support system to hold a subsection of the green tubular structure within the reactor and a feed system to advance each subsection of the green tubular structure continuously through an external volume within the reactor. The reactor also includes a gas supply system to supply at least one reactive gas into an internal volume within the internal lumen of the green tubular structure and into the external volume. In addition, the reactor includes an exhaust system to remove unreacted gas from the internal volume and from the external volume.

In yet other embodiments, an open-flow reactor produces a tubular structure made of a refractory metal compound by reacting a green tubular structure made of a refractory metal with at least one reactive gas. The open flow reactor includes a sealed reactor vessel containing a reactor volume. The reactor also includes an upper support and a lower support within the reactor volume, in which the upper support and the lower support are sealed to opposite ends of the green tubular structure, defining a closed internal volume within a lumen of the green tubular structure.

The reactor also includes an internal gas source with a gas source and an internal gas supply tube. One end of the internal gas supply tube is attached to the gas source and an opposite end of the internal gas supply tube passes through the lower support and opens into the internal volume. An external gas source is also included with an external gas supply tube. One end of the external gas supply tube is attached to the external gas source and an opposite end of the external gas supply tube opens into the external volume within the reactor volume and outside of the green tubular structure.

This reactor also includes an internal exhaust tube with one end passing through the upper support and opening into the internal volume, and an opposite end attaching to a vacuum source. Also included is an external exhaust tube, in which one end opens into the external volume and an opposite end attaches to the vacuum source.

Yet other embodiments provide a continuous-feed open-flow reactor for producing a tubular structure made of a refractory metal compound by reacting a series of linear subsections of an elongate green tubular structure made of a refractory metal with at least one reactive gas. The reactor includes a sealed reactor vessel with a vessel wall containing an upper opening and a lower opening, as well as a lower support and an upper support. The lower support is sealed to the lower opening and the upper support is sealed to upper opening, defining a closed reactor volume.

The lower support of this reactor also contains a feedstock entry opening through which the green tubular structure enters the reactor volume. The feedstock entry opening forms an air-tight seal around an outer perimeter of the green tubular structure. The upper support also contains a feedstock exit opening through which the green tubular structure exits the reactor volume. The feedstock exit opening forms an air-tight seal around the outer perimeter of the tubular structure. The reactor also includes a feedstock actuator operatively connected to the green tubular structure such that the actuator advances the green tubular structure through the reactor volume.

The reactor in these embodiments also includes an internal gas source with a gas source and an internal gas supply tube with one end attached to the internal gas source. An opposite end of the internal gas supply tube is attached to one end of the green tubular structure and opens into the internal volume. Also included is an external gas source with an external gas source and an external gas supply tube. One end of the external gas supply tube is attached to the external gas source and an opposite end of the external gas supply tube opens into the external volume within the reactor and outside of the subsection of the green tubular structure situated within the reactor.

This reactor embodiment further includes an internal exhaust tube with one end attached to an end of the green tubular structure opposite to the internal gas supply tube and opening into the internal volume. An opposite end of the internal exhaust tube is attached to a vacuum source. Also included is an external exhaust tube with one end opening into the external volume and an opposite end attached to the vacuum source.

Also provided in additional embodiments is a method of producing a tubular structure containing a refractory metal compound by reacting a green tubular structure made of a refractory metal with at least one reactive gas. In these embodiments, the method includes sealing the green tubular structure within a pressurized reactor such that each opposing end of the green tubular support is sealed, forming a closed internal volume within a lumen of the green tubular structure, and an external volume within the pressurized reactor outside of the green tubular structure. This method also includes supplying at least one reactive gas to the internal volume at an internal pressure, and supplying the at least one reactive gas to the external volume at an external pressure. In this embodiment of the method, the reactor is heated to a temperature ranging from about 500° C. to about 3000° C.

Further additional embodiments provide a method for producing a tubular structure made of a refractory metal compound by reacting a series of linear subsections of an elongate green tubular structure made of a refractory metal with at least one reactive gas. This method includes feeding a first subsection adjacent to one end of the green tubular structure into a pressurized reactor such that an external volume is sealed within the reactor outside of the green tubular structure. This method also includes supplying at least one reactive gas to an internal volume within a lumen of the green tubular structure at an internal pressure, as well as supplying the at least one reactive gas to the external volume at an external pressure. Further, the method in these embodiments includes heating the reactor to a temperature ranging from about 500° C. to about 3000° C. for a reaction time ranging from about 30 minutes to about 240 hours. This method further includes feeding a second subsection adjacent to the first subsection of the green tubular structure into the reactor. The first subsection is advanced out of the reactor and the second subsection is situated within the reactor volume. The temperature within the reactor is maintained at a temperature ranging from about 500° C. to about 3000° C. for the reaction time. Each subsequent subsection of the green tubular structure is fed into the reactor and heated for the reaction time until the refractory metal of the entire green tubular structure has been converted into a refractory metal compound such as a nitride or carbide, resulting in the tubular structure made of a refractory metal compound.

BRIEF DESCRIPTION

DETAILED DESCRIPTION

Unless otherwise defined, all technical and scientific terms used herein have the same meaning as commonly understood by one of ordinary skill in the art to which this disclosure belongs. All publications, patent applications, patents, and other references mentioned herein are incorporated by reference in their entirety.

Green Tubular Structure

Various embodiments of the device and method of the present disclosure may be used to produce tubular structures made of a refractory metal compound such as a metal carbide by contacting a green tubular structure made of a refractory metal with one or more reactive gases at a high temperature. The tubular structures are produced with minimal change to the size and shape of the green tubular structure.

A green tubular structure, as used herein, refers to a structure consisting essentially of a pure refractory metal such as, zirconium or tantalum, or a refractory metal alloy, including mixtures of refractory metals, prior to exposure to the one or more reactive gases in the reactor. A finished tubular structure, by contrast, refers to a structure consisting essentially of a refractory metal compound, such as zirconium carbide, after exposure to the one or more reactive gases, such as methane, in the reactor. A green tubular structure is transformed into a finished tubular structure.

Figure 1:
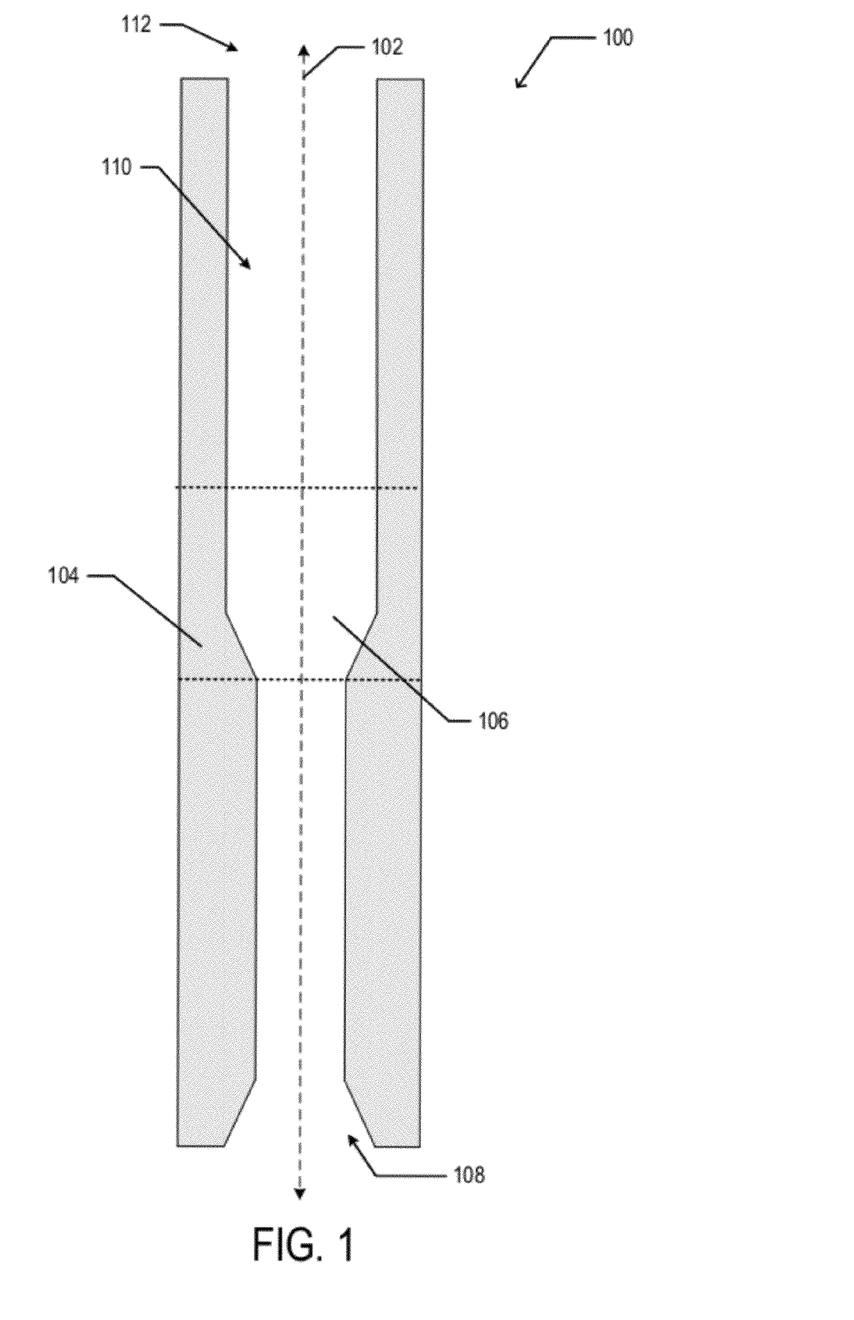
FIG. 1 is a drawing illustrating an exemplary tubular structure produced by the open-flow reactor.

A cross-sectional view of an exemplary green tubular structure 100 in a plane parallel to a longitudinal axis 102 of the structure is shown in FIG. 1. The green tubular structure 100 typically includes a refractory metal material formed into a continuous thin wall 104 enclosing a lumen 106 open at opposite ends 108 and 110 to an external volume 112 outside the tubular structure. The thin wall 104 may be of constant thickness, as shown in FIG. 1. Alternatively, the thin wall 104 may vary in thickness along the length of the green tubular structure 100. The thin wall 104 may also vary in thickness at different locations within any cross-section taken perpendicular to the longitudinal axis of the green tubular structure 100. Depending on the intended use of the green tubular structure 100, the thin wall 104 of the green tubular structure 100 may be porous or sufficiently thin for the diffusion of reactive gases through the thin wall.

In various embodiments, the cross-sectional size and/or shape of the green tubular structure and the lumen 106 may vary along the length of the structure 100. The cross-sectional size and shape of the lumen 106 may change along the length of the tubular structure 100 due to changes in the wall thickness, the external dimensions of the tubular structure, and combinations thereof. The cross-sectional shape of the green tubular structure 100 may be any suitable shape including but not limited to circular, elliptical, square, rectangular, octagonal, hexagonal, and triangular. In an exemplary embodiment, the cross-sectional shape of the tubular structure 100 is annular with a constant outer diameter, and may vary in wall thickness along the length of the structure.

In one embodiment, the ends 108 and 110 of the green tubular structure 100 are open. In another embodiment, one or both ends 108 and 110 are closed by the thin wall 104 thereby enclosing the interior lumen 106. In yet another embodiment, the green tubular structure 100 and/or the lumen 106 may be generally frusto-conical in shape.

The green tubular structure 100 may be produced using any suitable refractory metal known in the art. Non-limiting examples of refractory metals suitable for producing a green tubular structure include boron, chromium, hafnium, molybdenum, niobium, tantalum, titanium, tungsten, zirconium, and any alloys thereof. In an exemplary embodiment, the green tubular structure 100 is fabricated using zirconium as the refractory metal.

Any known fabrication method may be used to form the green tubular structure 100. Non-limiting examples of suitable fabrication methods for forming the green tubular structures include casting, machining, welding, sintering, and grinding.

1. Open-Flow Reactor

The open-flow reactor can be used to produce a finished tubular structure containing a refractory metal compound such as a nitride or carbide by reacting the green tubular structure 100 with a reactive gas such as nitrogen. The design of the reactor provides independently controlled reactive gas pressures inside and outside of the green tubular structure 100 which facilitate the diffusion of the reactive gases into the refractory metal material of the structure. In certain cases, such as when the tubular structure 100 includes a porous or very thin tube wall 104, a pressure gradient may be established across the tube wall by supplying the reactive gases inside the lumen 106 of the tubular structure at a different pressure than the supply gases supplied outside 112 the tubular structure. This pressure gradient may enhance the diffusion of reactive gases into the refractory metal material making up the wall 104 of the green tubular structure 100, thereby accelerating the conversion of the refractory metal into a refractory metal compound.

Refractory metals, as used herein, include metal elements that are typically highly resistant to wear and creep deformation at high temperatures. Refractory metals typically have melting points above about 2000° C., relatively high densities, and may include boron, chromium, hafnium, molybdenum, niobium, tantalum, titanium, tungsten, zirconium, and any alloys thereof. Refractory metal compounds, as defined herein, include compounds of refractory metals including nitrides, carbides, and borides that typically are also highly resistant to wear and creep deformation at high temperatures. Non-limiting examples of refractory metal compounds include zirconium nitride, zirconium carbide, and zirconium boride.

Figure 2:
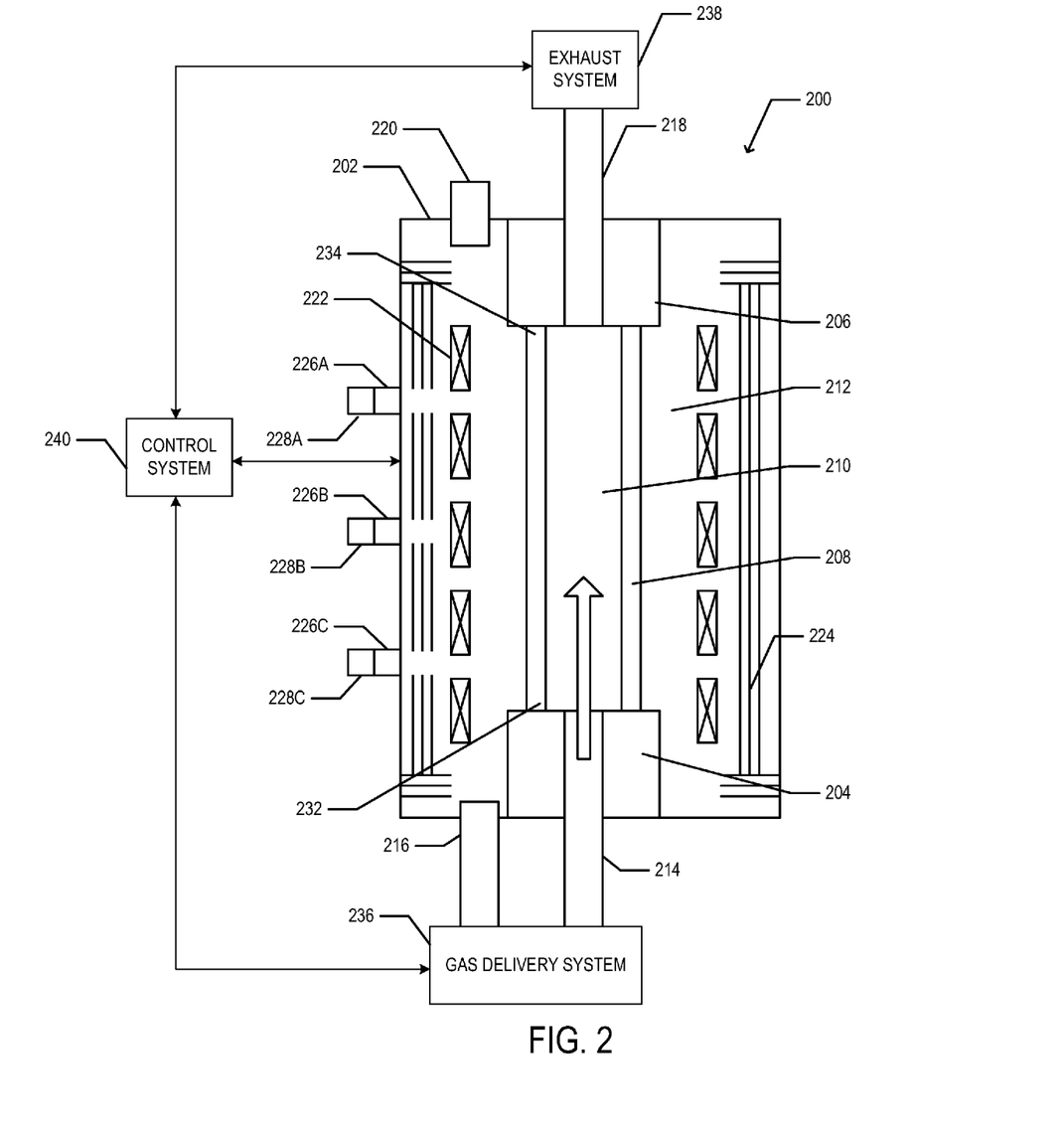
FIG. 2 is a drawing illustrating an exemplary open-flow reactor.

A cross-sectional view of an exemplary embodiment of an open-flow reactor 200 is illustrated in FIG. 2. The reactor 200 includes a sealed reactor vessel 202 that may be pressurized or evacuated to pressures ranging from about 0.001 ATM to about 5000 ATM. The reactor 200 further includes a green tubular structure 208 held in place by an upper support 206 and a lower support 204 that seal the ends of the green tubular structure 208, and enclose an internal volume 210 within the walls of the green tubular structure 208. The internal volume is hydraulically separated from an external volume 212 within the reactor vessel 202 that is outside of the green tubular body 208. At least one reactive gas supplied by a gas supply system 236 is introduced into the internal volume 210 and the external volume 212 through an internal gas supply tube 214 and an external gas supply tube 216, respectively. Unused reactive gases may be vented out of the internal volume 210 and the external volume 212 through an internal exhaust tube 218 and an external exhaust tube 220, both of which may be attached to an exhaust system 238.

The reactor 200 may also include a heating element 222 to heat the green tubular structure 208, the internal volume 210, and the external volume 212 to a temperature ranging between about 500° C. to about 3000° C. in order to carry out the conversion reaction between the at least one reactive gas and the refractory metal of the green tubular structure 208. A refractory metal heat shield 224, which may also be included in the reactor vessel 202, may help to produce a uniform temperature profile throughout the internal volume 210 and the external volume 212. The temperature at various locations within the reactor vessel 202 may be monitored by one or more temperature sensors 226A, 226B, and 226C, installed within temperature reading view ports 228A, 228B, and 228C, respectively. The monitored temperatures may be used as feedback to an automated control system 240 to control the heating element 222 and assure a uniform temperature profile.

Various embodiments of the reactor 200 may be configured as an upflow reactor in which the at least one reactive gas is injected into a bottom portion 242 of the reactor vessel 202 and the reactive gas flow direction is toward the top portion 244 of the reactor 200, as shown in FIG. 2. In other embodiments, the reactor 200 may be configured as a downflow reactor system in which the at least one reactive gas is injected at the top portion 244 of the reactor vessel 202 and the at least one reactive gas flows in a downward direction towards the bottom portion 242. Alternatively, the reactor 200 may configured in any suitable orientation including but not limited to a horizontal orientation, a vertical orientation, a 45° orientation relative to a vertical reference, and any intermediate orientation depending on the desired use of the reactor 200.

Characteristics of the various components of the reactor 200 are described in detail below.

Open-Flow Reactor a. Reactor Vessel

The reactor vessel 202 may mechanically support the components of the reactor 200. In addition, the reactor vessel 202 may form a hydraulically sealed container within which the reaction between the refractory metal of the green tubular structure 100 and the at least one reactive gas take place. The reactor vessel 202 may also insulate the heating components, such as the heating element 222 contained inside the reactor 200, and protect the environment surrounding the reactor 200 from thermal damage from the high temperatures inside the reactor 200. The reactor vessel 202 may be constructed as a single layer of material, or the sidewall may be constructed of two or more layers of at least one type of material.

Materials suitable for use in the construction of the reactor vessel 202 are selected to maintain structural integrity at pressures ranging from about 0.001 ATM to about 5000 ATM and temperatures ranging from about 500° C. to about 3000° C. Materials suitable for use in the construction of the reactor vessel 200 may include stainless steel and quartz.

The reactor vessel 202 may include at least one layer of suitable materials as described above and further include active cooling elements (not shown). Non-limiting examples of active cooling elements include radiative cooling elements such as heat vanes attached to the outer layer of the reactor vessel 202, conductive cooling elements such as one or more heat sinks in contact with any one or more of the layers of the reactor vessel 202, or convective cooling elements such as one or more fluid-cooled layers.

A fluid-cooled reactor vessel 202 may include at least one fluid-cooled outer layer that encases an uncooled inner layer. The outer layer may form a hollow container through which a cooling fluid may circulate, providing convective cooling to the reactor vessel walls. For example, the cooling fluid may be pumped under pressure into the fluid-cooled outer layer, which may further include capillary tubes, baffles, or other convective cooling elements.

The fluid used to provide convective cooling may be any suitable cooling fluid. For example, the cooling fluid may be a gas, such as air, nitrogen, helium, or carbon dioxide. Alternatively, the cooling fluid may be a liquid, such as water, ethylene glycol, diethylene glycol, propylene glycol, betaine, polyalkylene glycols, mineral oils, castor oil, silicone oils, and fluorocarbon oils. In an exemplary embodiment, water is used as the cooling fluid.

Any alternative methods of designing and sealing high-temperature pressurized vessels known in the art may be used in various embodiments of the reactor vessel 202 without departing from the spirit of this disclosure.

b. Support System

The support system holds the green tubular structure 208 within the reactor vessel 202 and seals the opposite ends of the green tubular structure 208, forming a closed internal volume 210 within the lumen of the green tubular structure 208. The support system may include the lower support 204 and the upper support 206. The green tubular structure 208 is held between the lower support 204 and upper support 206 within the reactor vessel 202. The lower end 232 of the green tubular structure 208 is sealed to the lower support 204 and the upper end 234 is sealed to the upper support 206, forming a closed internal volume 210 within the lumen of the green tubular structure 208.

The green tubular structure 208 may be attached to the lower and upper supports 204 and 206 by any means of attachment known in the art, so long as the attachment maintains a seal at temperatures ranging from about 500° C. to about 3000° C. and pressures ranging from about 0.001 ATM to about 5000 ATM. Further, the means of attaching the green tubular structure 208 to the support system may be selected so that the tubular structure may be removed from the support system after treatment within the reactor 200 without stressing or otherwise damaging the tubular structure. The lower end 232 and the upper end 234 of the green tubular structure 208 may be threaded and screwed into matching threaded fittings formed within the lower and upper supports 204 and 206, respectively. Other non-limiting examples of suitable means of attaching the green tubular structure 208 to the lower and upper supports 204 and 206 include compression fittings and flare connections.

c. Gas Supply System

The gas supply system 236 delivers at least one reactive gas such as nitrogen to the interior of the sealed reactor vessel 202. The at least one reactive gas contacts the exposed surfaces of the green tubular structure 208 within the internal volume 210 and the external volume 212. At the elevated temperature and pressure conditions within the reactor vessel 202, the at least one reactive gas undergoes a chemical reaction with the refractory metal material in the green tubular structure 210 to form the refractory metal compound of the tubular structure. In addition to providing reactants to the reactor 200, the gas supply system 236 may deliver at least one reactive gas to purge the internal volume 210 and external volume 212 of unwanted reactive environmental gases such as oxygen prior to heating the reactor 200. The at least one reactive gas may also cool at least one seal on the reactor vessel 202 during use.

The at least one reactive gas may be delivered to the interior of the sealed reactor vessel 202 at a pressure ranging from about 0.001 ATM to about 5000 ATM. Because the internal volume 210 and external volume 212 are hydraulically separated from each other by the support system and the green tubular structure 208 as described above, the reactive gas may be supplied to the internal volume 210 through the internal gas supply tube 214 at an internal supply pressure that is independent of the external supply pressure at which the reactive gas is supplied to the external volume 212 through the external gas supply tube 216. The internal supply pressure may be essentially the same as the external supply pressure, or the internal supply pressure may be higher or lower than the external supply pressure.

In various embodiments where the internal supply pressure is the same as the external supply pressure, the reactive gas may be transported into the refractory metal material beneath the exposed surface of the green tubular structure 208 by diffusive transport. In these embodiments, the reactive gas is driven inward by a concentration gradient between the relatively low concentration of reactive gas below the surface and the relatively high concentration of reactive gas near the exposed surfaces 246 and 248 of the green tubular structure 208. The diffusive transport may be supplemented by convective transport in which the reactive gas moves from a region of elevated pressure at the exposed surfaces 246 and 248 to a region of lower pressure within the green tubular structure 208 beneath the exposed surfaces 246 and 248.

For those embodiments in which the internal supply pressure is higher or lower than the external supply pressure, a pressure gradient is formed between the internal volume 210 and the external volume 212. In these embodiments, the reactive gas moves through the refractory metal material by unidirectional convective transport in which the reactive gas moves from one surface, such as the surface 246 exposed to higher pressure to another surface, such as the surface 248 exposed to lower pressure. For example, if the internal supply pressure is higher than the external supply pressure, then the reactive gas may move through the refractory metal from the internal volume 210 to the external volume 212. These embodiments are especially effective for the green tubular structure 208 in which the thickness of the walls is especially thin or the refractory metal material permits lattice diffusion. Zirconium, for example, permits the reactive gas to diffuse through its lattice structure.

The particular species of reactive gas supplied to the reactor 200 may be selected based on the desired composition refractory metal compound produced by the reactor 200. Non-limiting examples of reactive gas species suitable for use in the gas supply system 236 include nitrogen, $CH_4$, $C_2H_2$, $C_3H_8$, $B_2H_6$, $NH_3$, and combinations thereof. The composition of reactive gas supplied to the internal volume 210 may be the same or different from the composition of reactive gas supplied to the external volume 212. For example, the internal volume 210 of a zirconium tubular structure may be filled with nitrogen, and the external volume may be filled with a mixture of nitrogen and methane.

The gas supply system 236 is in fluid communication with the internal gas supply tube 214 and may also be in fluid communication with the external gas supply tube 216. The external gas supply tube 216 is connected to the gas source at one end, passes through the wall of the reactor vessel 202, and opens into the external volume 212 at the opposite end. The gas supply system 236 may include a gas source (not shown) further having at least one pressurized gas container and a connection fitting hydraulically connected to the one end of the internal gas supply tube 214, the one end of the external gas supply tube 216, or both gas supply tubes 214 and 216. The internal gas supply tube 214 may be attached to the same gas source as the external gas supply tube 216, or the internal gas supply tube 214 may be attached to another gas source (not shown). The gas supply system 236 may further include a manual or electrically controllable internal pressure valve (not shown) to control the rate of flow of reactive gases into the internal volume 210 and a similar external pressure valve (not shown) to control the rate of flow of reactive gases into the external volume 212. The gas supply tubes 214 and 216 may be constructed of any suitable material known in the art, and may also include insulation to prevent the heating of the reactive gas mixture as it enters the reactor 200.

Figure 3:
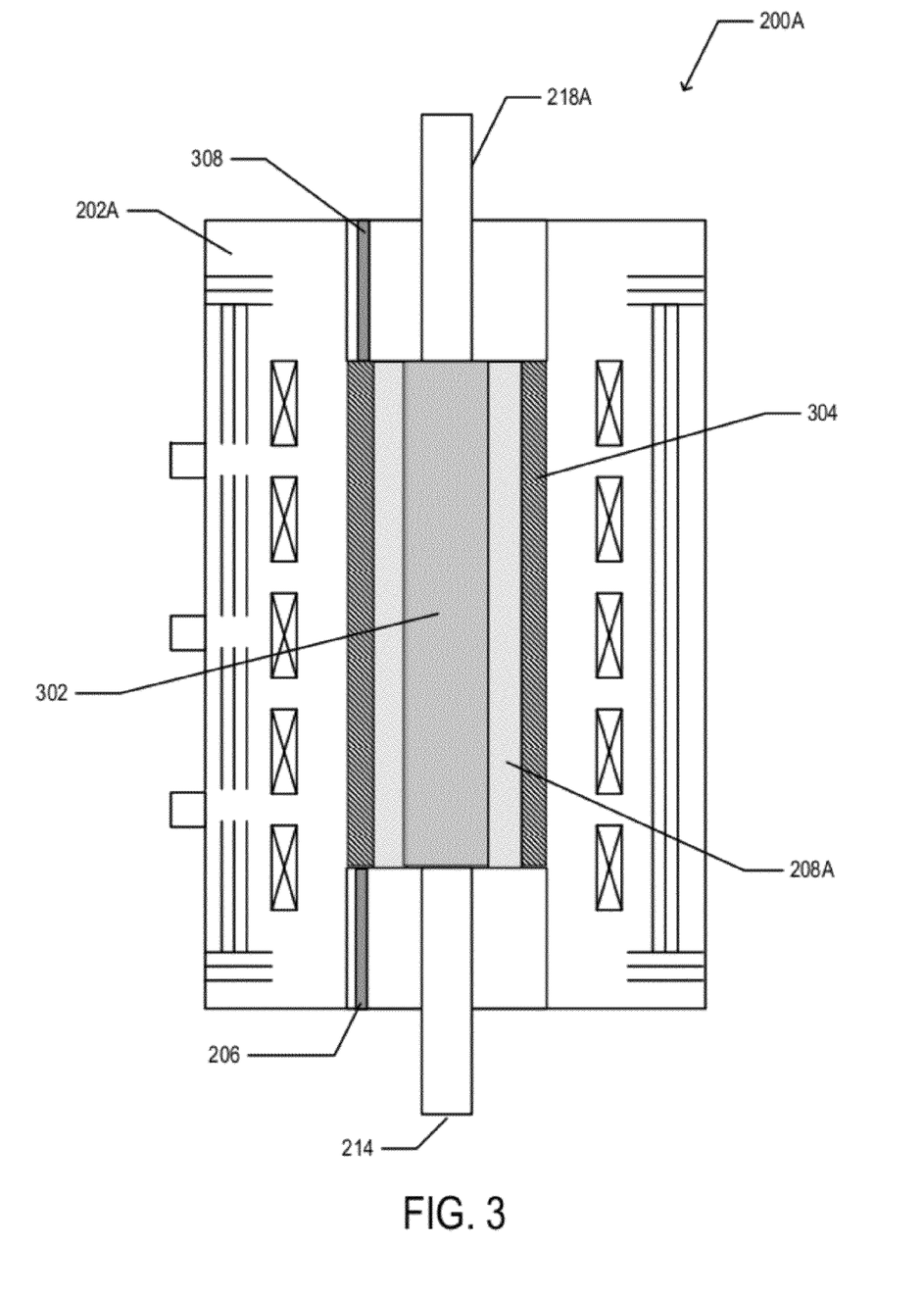
FIG. 3 is a drawing illustrating an exemplary open-flow reactor packed with a solid reactive gas source.

In other embodiments, a reactive gas may also be supplied by the outgassing or sublimation of a solid material placed in the reactor 200. The solid material may be the sole source of reactive species, or the solid material may supplement other reactive species supplied by the gas supply system 236. An exemplary reactor embodiment that uses a solid material for the generation of reactive gas is illustrated in FIG. 3. In this reactor 200, a solid material 302 is placed into the interior volume 210, and a solid material 304 is placed into the exterior volume 212. The composition of the solid materials 302 and 304 may be selected based on the desired composition of refractory metal compound for the tubular structure produced by the reactor. Non-limiting examples of suitable solid materials that may be used as a reactive species source include boron, boron nitride, graphite, and combinations thereof.

The reactive species may be released by the solid materials 302 and 304 under conditions of elevated temperatures ranging from about 500° C. to about 3000° C., reduced pressures down to about 0.001 ATM, or any combination thereof. Further, the release of reactive gas from the solid materials 302 and 304 may be facilitated by the introduction by the gas supply system 236 of at least one support gas that reacts with the solid materials 302 and 304 into the internal and external volumes 210 and 212, respectively. Non-limiting examples of support gases include nitrogen, hydrogen, argon, water vapor, and combinations thereof.

The solid materials 302 and 304 may be in the form of a finely-divided powder or larger particles. The size of the solid material particles may be selected on the basis of at least one of at least several factors. The particles must be small enough to physically fit within the interior and exterior volumes 210 and 212. Although smaller particles provide a larger surface area through which reactant gases may be formed and released, smaller particles may also offer more hydrodynamic resistance to the movement of reactive gases and/or support gases through the internal and external volumes 210 and 212. In addition, extremely small particles may be prone to removal from the internal and external volumes 210 and 212 due to convection by the support gases and/or reactive gases, and may further result in fouling of the reactor components such as the exhaust system. In an embodiment, the solid materials 302 and 304 may be physically pressed into the internal and external volumes 210 and 212 to pack the solid materials prior to starting the reactor 200.

d. Exhaust System

The exhaust system 238 is in communication with the internal exhaust tube 218 and the external exhaust tube 220 and may be attached to the reactor 200 in various embodiments. The exhaust system removes oxygen and other unwanted atmospheric gases from the interior of the reactor vessel 202 prior to operating the reactor 200, and additionally creates the gas flow velocities through the reactor vessel 202 by exhausting the reactive gases introduced by the gas supply system at the opposite end of the reactor 200.

The exhaust system 238, may also include a vacuum system (not shown). The internal exhaust tube 218 may be connected to the vacuum source at one end, and may pass through the upper support 206 and open in to the internal volume 210 at an opposite end. The external exhaust tube 220 may connect to the vacuum source at one end and may pass through the wall of the reactor vessel 202 and open into the external volume 212 at an opposite end.

The vacuum source may include at least one depressurized gas container and a connection fitting hydraulically connected to the one end of the internal exhaust tube 218, the one end of the external exhaust tube 220, or both exhaust tubes 218 and 220. The internal exhaust tube 218 may be attached to the same vacuum source as the external exhaust tube 220, or the internal exhaust tube 218 may be attached to a second vacuum source. The exhaust tubes 218 and 220 may be constructed of any suitable material known in the art.

The exhaust system may further include a manual or electrically controllable internal exhaust valve (not shown) to control the rate of flow of unused reactive gases out of the internal volume 210 and a similar external exhaust valve (not shown) to control the rate of flow of unused reactive gases from the external volume 212. In one embodiment, each exhaust valve is set and adjusted manually by an operator of the reactor 200. In other embodiments, each vacuum valve is electronically adjusted based on a predetermined schedule or in response to a control command generated by a control system 240. The control system 240 identifies control commands using the analysis of measured properties of the reactor 200 including temperatures, pressures, and gas flow rates measured by sensors within the reactor vessel 202.

The vacuum source may further include a two-stage pump to depressurize the at least one depressurized gas container.

The first stage may be a mechanical vacuum pump used to reduce the base pressure within the internal volume 210, the external volume 212, or both volumes 210 and 212 to about $10^{-4}$ torr and to maintain this base pressure during the operation of the reactor 200 by way of a butterfly valve. The second stage of the two-stage pump may be either a turbo pump or a diffusion pump used after completion of purging of the reactor to reduce the internal pressure of the reactor to about $10^{-9}$ torr.

e. Heating System

In general, the heating system maintains a high temperature within the internal volume 210, the external volume 212, and the green tubular structure 208 in order to provide suitable reaction conditions for the refractory metal of the green tubular structure 208 and the reactive gases. Any method of generating heat may be used within the heating system, so long as the method is capable of maintaining a temperature ranging from about 500° C. to about 3000° C. Non-limiting examples of suitable methods of heating for the heating system include induction heating and resistive heating.

As shown in FIG. 2, the heating system may include heating elements 222 situated around the outer region of the external volume 212 and further situated along the length of the green internal structure 208. If inductive heating methods are used, the heating elements 222 may be induction heating coils. In addition, at least one susceptor (not shown) may be placed near the walls of the green tubular structure 208 within the internal volume 210, the external volume 212, or within both volumes 210 and 212 to enhance the inductive heating effect. The susceptor may be constructed from a single piece of a refractory material. Suitable refractory materials may have low chemical reactivity with any of the reactive gases introduced into the reaction vessel 202 by the gas supply system. In addition, suitable refractory materials may have good thermal conductivity and/or susceptibility to inductive heating. Non-limiting examples of refractory materials suitable for use as a susceptor include tantalum carbide, zirconium carbide, zirconium nitride, and zirconium boride.

In one embodiment, the heating elements 222 may be structure of a single stage heating system that includes a single heated region within the reactor vessel 202. Alternatively, the heating elements 222 may be structure of a multiple stage heating system that includes two or more independently-controlled heated regions within the reactor vessel 202. In one embodiment, the amount of heat produced by each of the heating elements 222 is set and adjusted manually by an operator of the reactor 200. In other embodiments, each heating element 222 is electronically controlled based on a predetermined schedule or in response to a control command generated by the control system 240. The control system 240 identifies control commands using the analysis of temperatures measured by a temperature monitoring system.

f. Heat Shielding System

The reactor 200 may include a heat shielding system to help maintain a uniform temperature profile throughout the interior volume 210 and exterior volume 212, as well as to protect the materials forming the walls of the reactor vessel 202 from damage or degradation due to exposure to high temperatures. Referring to FIG. 2, the heat shielding system may include a refractory metal heat shield 224 that forms a continuous outer layer around the volume within the reactor vessel 202. Any suitable material known in the art may be used to construct the heat shielding system, so long as the material is capable of functioning at temperatures ranging from about 500° C. to about 3000° C. Non-limiting examples of suitable materials for the construction of a heat shielding system include a refractory metal and a foam graphite material.

g. Temperature Monitoring System

The reactor 200 may include a temperature monitoring system to measure the temperatures at different regions within the reactor vessel during the operation of the reactor 200. These measured temperatures may be used to assess the performance of the reactor, or the measured temperatures may be monitored and used by the control system 240 to control the output of the heating system.

The temperature monitoring system may include one or more temperature sensors. The temperature within one or more regions of the reactor vessel 202 may be monitored by one or more thermal sensors 226A, 226B, and 226C that access the interior of the reaction vessel 202 through one or more temperature reading view ports 228A, 228B, and 228C. Any known temperature sensor 226 may be used to measure temperatures within the reactor vessel 202, so long as the operating range of the temperature sensor encompasses temperatures ranging from about 500° C. to about 3000° C. Non-limiting examples of suitable temperature sensors include optothermometers, thermocouples, and thermistors.

h. Control System

In addition to the specific systems described above, the processes performed by the systems and components of the reactor 200 may be controlled by the control system 240. The control system 240 may include manual inputs to the various components of the reactor 200, or the control system may be an automated control system that autonomously controls the processes of the reactor 200. The control system 240 may be an open-loop system, in which predetermined control commands to modify the processes of the reactor 200 are issued sequentially to perform the functions of the reactor 200. Alternatively, the control system 240 may be a closed-loop control system, in which the control system may process feedback information measured from one or more sensors including a weight sensor, a temperature sensor, a pressure sensor, or a flow velocity sensor, to develop commands used to perform the functions of the reactor 200.

Any one or more processes performed by the reactor 200 may be actively controlled by the control system 240. The control system 240 may include at least one sensor that monitors at least one process condition within the reactor 200. Non-limiting examples of a process condition include a temperature, a pressure, and a flow rate measured at one or more locations within the reactor 200. In one embodiment, the measured reactor temperatures are processed by the control system 240. Any suitable sensor known in the art may be used to monitor the process conditions, including but not limited to optothermometers, thermocouples, thermistors, piezoelectric pressure sensors, force transducers, and strain gages. The signal produced by the at least one sensor may be monitored by at least one processor included in the feedback control system 240. In addition, the processor may calculate and monitor a mathematical function of a process condition, including but not limited to the time rate of change of a process condition or the acceleration with respect to time of a process condition.

The control system 240 may include at least one processor to receive information from one or more process sensors and to generate at least one control command. The at least one processor generates the at least one control command to alter a process condition based on any control scheme known in the art, including but not limited to any linear or non-linear control strategy. Any control command may be transmitted to one or more particular elements of the reactor 200 in order to modify one or more operating conditions of the reactor 200. The modification to the operating conditions may result in a desired change in one or more process conditions, or in the maintenance of one or more process conditions at an essentially constant level. For example, the control system 240 may generate a control command to the heating system to reduce the voltage of the applied electric field in response to an increase in the temperature within the reactor vessel 202 to a temperature above a desired temperature range. Non-limiting examples of an operating condition that may be modified by commands from the feedback control system 240 include gas supply pressure, vacuum pressure, and heater temperature.

Continuous-Feed Open-Flow Reactor

Figure 4:
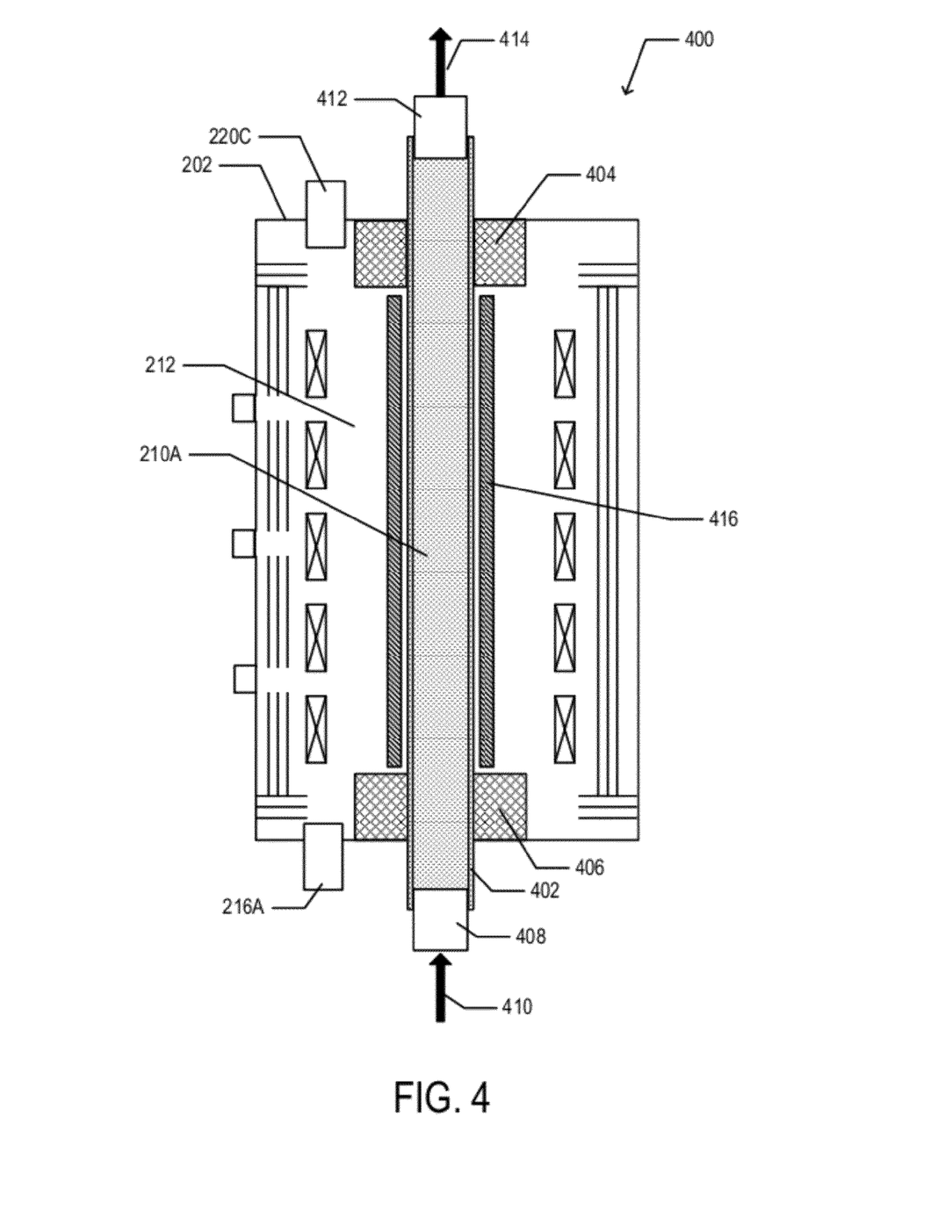
FIG. 4 is a drawing illustrating an exemplary continuous-feed open-flow reactor.

Referring now to FIG. 4, an embodiment of a continuous-feed open-flow reactor that produce a finished tubular structure containing a refractory metal compound such as a nitride or carbide by reacting a series of linear subsections of an elongate green tubular structure 402 formed from a refractory metal such as zirconium with a reactive gas such as nitrogen. The design and systems of the continuous-feed open-flow reactor 400 are substantially similar to the corresponding designs and systems of the open-flow reactor 200 described previously, with the addition of a feed system to advance the green tubular structure through the reactor in a step-wise or continuous manner.

The green tubular structure 402, which may be longer than the reactor vessel, may be inserted into the reactor vessel one subsection at a time by the feed system. Further, the green tubular structure 402 may repositioned during the operation of the reactor such that a subsection of the green tubular structure that has had its refractory metal converted into the refractory metal compound within the reactor vessel is advanced out of the reactor. A non-converted adjacent subsection of the green tubular structure 402 is then advanced into the reactor vessel to replace the previous subsection.

The other systems of the reactor, including the support system, the gas supply system 236, the exhaust system 238, the heating system, the heat shielding system, the temperature monitoring system, and the control system 240, are similar in function to the function of the systems described above. Minor modifications, may be necessary in order to accommodate the continuous feeding of the green tubular structure through the reactor while the reactor is in operation. An exemplary embodiment of a continuous-feed open-flow reactor 400 is illustrated in FIG. 4. The reactor 400 includes a sealed reactor vessel 202 that may be pressurized or evacuated to pressures ranging from about 0.001 ATM to about 5000 ATM. The reactor 202 further includes a green tubular structure 402 that is typically longer than the reactor 400 that is held in place by an upper support 404 and a lower support 406 that seal the ends of the reactor vessel 202 where the green tubular structure 402 enters and exits the reactor vessel 202. Because the ends of the green tubular structure 402 extend past the ends of the reactor 202, the internal volume 210A is hydraulically separated from the external volume 212 within the reactor vessel 202 that is outside of the green tubular body 402.

At least one reactive gas 410 is introduced into the internal volume 210A through an internal gas supply tube 408 attached to one end of the green tubular structure 402, and unused reactive gases 414 may be vented out of an internal exhaust tube 412 attached to an opposite end of the green tubular structure 402. At least one reactive gas may be vented into and out of the external volume 212 through the external gas supply tube 216A and external exhaust tube 220C, respectively.

The reactor 200 may also include an inductive heating element 222 and a susceptor 416 to heat the subsection of the green tubular structure 402 within the reactor vessel 202. The subsection may be heated to a temperature ranging between about 500° C. to about 3000° C. in order to carry out the conversion reaction between the at least one reactive gas and the refractory metal of the green tubular structure 402.

Figure 5A:
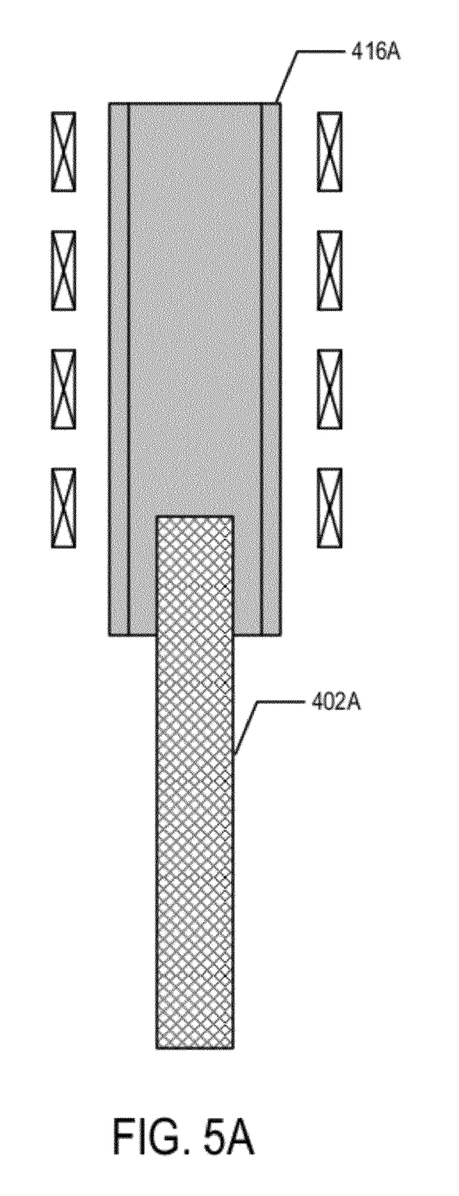
FIGS. 5A-B are drawings illustrating the conversion of a refractory metal tube into a refractory metal compound within an exemplary continuous-feed open-flow reactor.
Figure 5B:
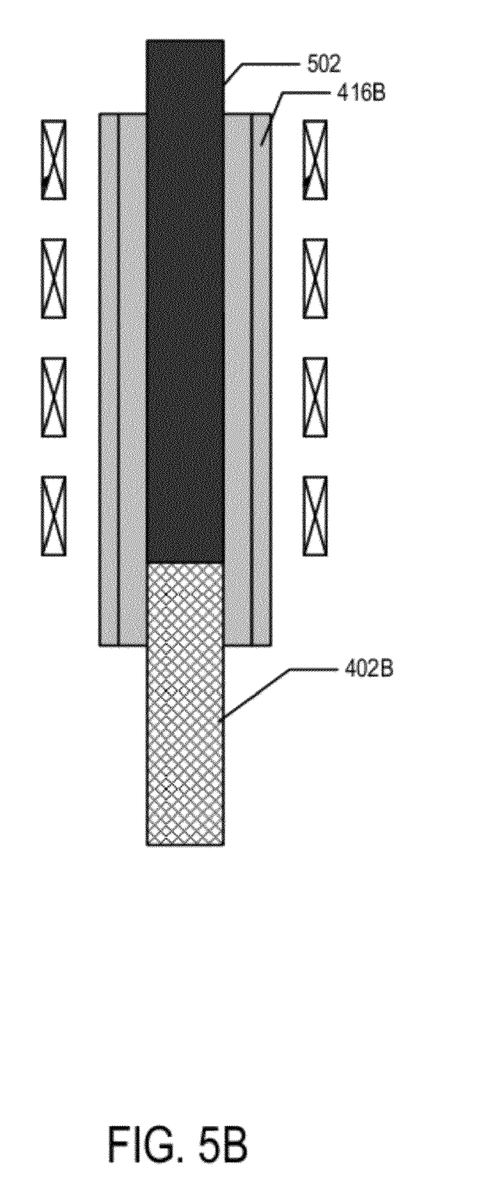

The principle of operation of the continuous-feed open-flow reactor 400 is illustrated in FIGS. 5A and 5B. FIG. 5A shows the green tubular structure 402 initially advancing into the susceptor 416A of the heating system. In FIG. 5A, the green tubular structure 416A is still essentially made of a refractory metal material. FIG. 5B shows the tubular structure 402B after the reactor has converted the subsection 502 that was inside the reactor 400 from a refractory metal to a refractory metal compound such as a nitride or carbide, as described previously. In FIG. 5B, the subsection 502 is advanced out of the reactor, and the adjacent subsection is advanced into the reactor to be converted into a refractory metal compound.

Various embodiments of the continuous-feed open-flow reactor 400 may be configured as an upflow reactor in which the at least one reactive gas 410 is injected into the bottom of the reactor vessel 202 and the reactive gas flow direction is toward the top of the reactor 400, as shown in FIG. 4. In other embodiments, the reactor 400 may be configured as a downflow reactor system in which the at least one reactive gas is injected at the top of the reactor vessel 202 and the at least one reactive gas flows in a downward direction. Alternatively, the reactor 400 may configured in any suitable orientation including but not limited to a horizontal orientation, a vertical orientation, a 45° orientation relative to a vertical reference, and any intermediate orientation depending on the desired use of the reactor 400.

Minor modifications to the various systems and components of the continuous-feed open-flow reactor 400 relative to the open-flow reactor 200 described previously are described in detail below.

a. Green Tubular Structure

The green tubular structure 402, shown in FIG. 4, is substantially similar in structure and composition to the green tubular structure 208 described previously. However, the green tubular structure 208 is held in place during the operation of the reactor by the support system and is limited to a length that fits within the open-flow reactor 200. By contrast, the green tubular structure 402 may be a length that is longer than the continuous-feed open-flow reactor 400. However, the design of the continuous-feed open-flow reactor 400 introduces at least one or more constraints on the overall shape of the green tubular structure 402.

In one embodiment, the green tubular structure 402 may be substantially straight in order to facilitate advancing the structure 402 through the reactor 400. In another embodiment, the green tubular structure 402 may be curved, and the upper and lower supports 404 and 406 include flexible seals in order to accommodate the curvature of the structure as it advances through the reactor 400. Similarly, the external cross-sectional size and shape of the green tubular structure 402 may be designed with minimal variation along the length of the structure 402, in order to minimize the amount of accommodation by the seals within the upper and lower supports 404 and 406 as the structure 402 advances through the reactor 400. The wall thickness of the green tubular structure 402 may vary along the length of the structure 402, similar to the green tubular structure 100 shown in FIG. 1, without affecting the function of the continuous-feed open flow reactor 400.

b. Support System

Referring back to FIG. 4, the support system holds the green tubular structure 402 in place within the reactor 400, and seals the ends of the reactor 400 against the outer circumference of the structure 402, in order to form a hydraulically sealed external region 212 within the reactor vessel 202. The support system includes a lower support 406 which is sealed to a lower opening formed in the reactor vessel 202. The lower support 406 also forms a feedstock entry through which the green tubular structure 402 is inserted into the reactor vessel 202. The feedstock entry may be designed to allow the movement of the green tubular structure 402 into the reactor 400, and to seal against the outer surface of the structure 402, forming a sealed external volume 212 within the reactor vessel 202. Any suitable means of sealing the feedstock entry known in the art may be used, so long as the seal is able to function at reactor temperatures ranging from about 500° C. to about 3000° C. and pressures within the external volume 212 ranging from about 0.001 ATM to about 5000 ATM.

The support system further includes an upper support 404 which is sealed to an upper opening formed in the reactor vessel 202. The upper support 404 also forms a feedstock exit through which the green tubular structure 402 is removed from the reactor vessel 202. The feedstock exit may be designed to allow the movement of the green tubular structure 402 out of the reactor 400, and to seal against the outer surface of the structure 402, forming the sealed external volume 212 within the reactor vessel 202. Any suitable means of sealing the feedstock entry known in the art may be used, so long as the seal is able to function at reactor temperatures ranging from about 500° C. to about 3000° C. and pressures within the external volume 212 ranging from about 0.001 ATM to about 5000 ATM.

c. Feed System

The feed system advances the green tubular structure 402 through the reactor 400 in order to convert the refractory metal materials of each adjacent subsection of the structure 402 into refractory metal compounds within the reactor 400 in a continuous manner. Because the size of the green tubular structure is not limited in size to fit within the reactor 400, the capability of forming tubular structures of longer lengths is enhanced. The feed system may include any suitable feedstock actuator known in the art operatively connected to the green tubular structure 402. Non-limiting examples of suitable feedstock actuators include hydraulic actuators, electro-mechanical actuators including stepper motors, and linear motor actuators.

The feed system may advance the green tubular structure 402 through the reactor according to a predetermined schedule, or the feed system may receive one or more control commands from a control system, such as the control system 240. The control system 240 may include at least one processor, as described previously, that processes information concerning one or more process conditions measured by at least one sensor within the reactor 400. In addition to the temperature, pressure, and gas flow rates measured by various sensors as described previously, the control system 240 may further monitor other process conditions that indicate the degree to which the refractory metal of the structure 402 has been converted into the refractory metal compound. Non-limiting examples of process conditions that may indicate the degree of conversion of refractory metal to refractory metal compound include the composition or concentration of the unused reactive gases exiting the system and the color of the green tubular structure 402 within the reactor 400. The control commands generated by the control system 240 may be any suitable command known in the art including but not limited to rate of advancement through the reactor and amount of time between movements of the tubular structure 402 through the reactor 400, the distance of advancement of the structure 402 through the reactor 400.

The feed system may advance the green tubular structure 402 continuously through the reactor 400 at a constant advancement speed or at an advancement speed that varies with time. Alternatively, the feed system may advance the green tubular structure 402 through the reactor 400 in discrete phases, in which each adjacent subsection of the structure 402 is held within the reactor for a specified reaction time. Once a subsection has been held within the reactor 400 for the reaction time, the tubular structure is advanced a discrete amount so that the subsection exits the reactor and the next adjacent subsection enters the reactor 400, where it is held for the reaction time. In other embodiments, the movement of the green tubular structure 402 may be determined based on an assessment of the conversion of the refractory metal material into a refractory metal compound as described previously.

The feed system may also include a sealed environmental chamber to prevent the reaction of the green tubular structure 402 with atmospheric gases such as oxygen. Due to heat conduction through the material, the subsections of the tubular structure 402 protruding from the reactor 400 may be at a temperature that is sufficiently high to result in reactions between the refractory metal or refractory metal compound and environmental gases such as oxygen or nitrogen. The environmental chamber may be depressurized to reduce the environmental gases in contact with the protruding tubular structure. Alternatively, the environmental chamber may be filled with an inert gas such as helium to prevent unwanted reactions outside of the reactor 400. In other embodiments, the protruding ends of the tubular structure 402 may be contacted with a heat sink in order to maintain the temperature of the protruding tubular structure 402 below a reactive temperature. In yet other embodiments, the internal pressure may be maintained at a higher pressure relative to the atmospheric temperature outside of the reactor vessel 202 in order to maintain a pressure gradient. This pressure gradient drives an outward convection of reactive gases from the lumen of the tubular structure 402 to the exterior surface of the structure 402, thereby displacing any atmospheric gases that may diffuse inward. Any or all of these embodiments may be used in any combination to prevent unwanted reactions between the tubular structure 402 and the atmosphere.

d. Gas Supply System and Exhaust System

The gas supply system and exhaust systems of the continuous-feed open-flow reactor functions in an essentially identical manner to the corresponding systems described previously for the open-flow reactor 200. Referring to FIG. 4, at least one reactive gas may be introduced into one end of the green tubular structure 402 through an internal gas supply tube 408 and removed from the opposite end through an internal exhaust pipe 412. The internal gas supply tube 408 is attached to a gas source as previously described, and the internal exhaust pipe is attached to a vacuum source as previously described. In addition to all of the characteristics of the gas supply system and exhaust system described previously for the open-flow reactor 200, the internal gas supply tube 408 and the internal exhaust tube 412 may further include a flexible or distortable segment to accommodate the movement of the green tubular structure 402 through the reactor 400 during operation.

3. Methods of Producing a Tubular Refractory Metal Structure

In various embodiments, the disclosure provides a method for producing a refractory metal structure, including the tubular structures 100 and 408, made of a refractory metal compound by reacting a green structure made of a refractory metal with at least one reactive gas. In one embodiment, the green structure is tubular and sealed within a pressurized reactor. Within the reactor, the opposing ends of the green tubular structure are also sealed, thereby forming a closed internal volume within a lumen of the green tubular structure. The remaining external volume within the pressurized reactor outside of the green tubular structure is also hydraulically sealed.

At least one reactive gas, such as nitrogen or methane, is supplied to the internal volume at an internal pressure, and at least one reactive gas is supplied to the external volume at an external pressure. The reactor is heated to a temperature ranging from about 500° C. to about 3000° C. The reactor may be heated for a time ranging from about 30 minutes to about 240 hours, depending on the specific refractory metal and reactive gases, as well as the amount of material contained in the green tubular structure. The internal pressure and external pressure may be specified independently because the internal volume and external volume are hydraulically sealed from each other. The internal and external pressures may be equal in magnitude, or the internal pressure may be greater or less than external pressure, resulting in a pressure gradient across the wall of the green tubular structure, as described previously. The maximum external pressure may be limited by the maximum pressure that may be delivered by the gas supply system or the bursting pressure of the reactor vessel, whichever is less. Similarly, the maximum internal pressure may be limited by the maximum pressure that may be delivered by the gas supply system or the bursting pressure of the seals of the support system or the refractory metal material of the green tubular structure, whichever is less. In addition, because the green tubular structure is subject to internal and external pressurization, the maximum internal pressure and external pressure may also depend on the differential pressure between the internal pressure and the external pressure used in the reactor. For example, if the bursting strength of the green tubular structure physically limited the pressures, the maximum internal pressure would be higher for larger external pressures, and the maximum external pressure would be higher for larger internal pressures.

In other embodiments, the disclosure provides a method for producing a tubular structure made of a refractory metal compound by reacting a series of linear subsections of an elongate green tubular structure made of a refractory metal with at least one reactive gas. In these embodiments, a first subsection adjacent to one end of the green tubular structure is fed into a pressurized reactor volume of a reactor such that an external volume is sealed within the reactor volume outside of the green tubular structure. The opposite ends of the green tubular structure are sealed outside of the reactor to form a sealed internal volume within the lumen of the tubular structure.

At least one reactive gas is supplied to the internal volume at an internal pressure and to the external volume at an external pressure. The reactor is then heated to a temperature ranging from about 500° C. to about 3000° C. for a reaction time ranging from about 30 minutes to about 240 hours. The internal and external pressures may be independently specified as previously described. During the reaction time, the refractory metal of the green tubular structure in the first subsection is converted into a refractory metal compound.

A second subsection adjacent to the first subsection of the green tubular structure is then fed into the reactor, and the first subsection is advanced out of the reactor. The second subsection is situated within the reactor volume, resulting in the displacement of the first subsection out of the reactor. The reactor is maintained at a temperature ranging from about 500° C. to about 3000° C. during the time that the second subsection is fed into the reactor and the second subsection is held within the reactor for the reaction time. This process of advancing the next adjacent subsection of the green tubular structure into the reactor and retaining the subsection within the reactor for the reaction time is repeated until the entire length of the green tubular structure has been converted into a refractory metal compound.

The various embodiments of the methods of producing tubular structures made of a refractory metal compound may be accomplished using any suitable equipment, including the flow-through reactor 200 and continuous-feed flow-through reactor 400 described previously and illustrated in FIGS. 2 and 4, respectively.

The refractory metal structures produced by the methods disclosed herein may be used in a number of high-temperature applications. For example, the refractory metal structures may be used as walls for a furnace or crucible. In another example, the refractory metal structures may be used as support structures within a high temperature furnace or reactor. The structures also may be used in any of a number of other high-temperature and/or high-temperature temperatures, without departing from the spirit of the disclosure.

While the disclosure has been explained in relation to exemplary embodiments, it is to be understood that various modifications thereof will become apparent to those skilled in the art upon reading the description. Therefore, it is to be understood that the disclosure disclosed herein is intended to cover such modifications as fall within the scope of the appended claims.

What is claimed is:

1. A method for producing a refractory metal structure comprising a refractory metal compound by reacting a green refractory metal structure comprising a refractory metal with at least one reactive gas, the method comprising:
    sealing the green refractory metal structure within a pressurized reactor such that each opposing end of the green refractory metal structure is sealed, forming a closed internal volume within a lumen of the green refractory metal structure, and forming an external volume within the pressurized reactor outside of the green refractory metal structure;
    supplying at least one reactive gas to the internal volume at an internal pressure;
    supplying the at least one reactive gas to the external volume at an external pressure
    establishing a pressure gradient by setting the internal pressure to a different pressure than the external pressure; and,
    heating the reactor to a temperature ranging from about 500° C. to about 3000° C.

2. The method of claim 1, wherein the reactor is continuously heated for a time ranging from about 30 minutes to about 240 hours.

3. The method of claim 1, wherein the internal pressure ranges from about 0.001 ATM to about 5,000 ATM and the external pressure ranges from about 0.001 ATM to about 5,000 ATM.

4. The method of claim 1, wherein the method further comprises packing a solid gas source within the reactor prior to sealing the green refractory metal structure within the reactor, wherein the solid gas source may be packed within the internal volume, within the external volume, or within the internal and external volume.

5. The method of claim 1, wherein the reactor is heated to a temperature ranging from about 1500° C. to 2300° C.

6. The method of claim 5, wherein the reactor is heated to a temperature of about 2000° C.

7. The method of claim 1, wherein the at least one reactive gas is selected from a group consisting of nitrogen, methane, and diborane.

8. The method of claim 1, wherein the refractory metal is selected from the group consisting of zirconium, hafnium, and alloys thereof.

9. The method of claim 1, wherein the refractory metal structure is tubular.

10. The method of claim 9, wherein a cross-section of the refractory metal structure is circular, square, triangular, or rectangular.

11. The method of claim 9, wherein the tubular refractory metal has a closed end.

12. The method of claim 9, wherein the tubular refractory metal is frusto-conical.

13. A method for producing a refractory metal structure comprising a refractory metal compound by reacting a series of linear subsections of an elongate green refractory metal structure comprising a refractory metal with at least one reactive gas, the method comprising:

feeding a first subsection adjacent to one end of the green tubular structure into a pressurized reactor volume of a reactor such that an external volume is sealed within the reactor volume outside of the green tubular structure;

supplying at least one reactive gas to an internal volume within a lumen of the green tubular structure at a internal pressure, wherein the internal pressure ranges from about 0.001 ATM to about 5,000 ATM;

supplying the at least one reactive gas to the external volume at an external pressure, wherein the external pressure ranges from about 0.001 ATM to about 5,000 ATM;

establishing a pressure gradient by setting the internal pressure to a different pressure than the external pressure;

heating the reactor to a temperature ranging from about 500° C. to about 3000° C. for a reaction time ranging from about 30 minutes to about 240 hours;

feeding a second subsection adjacent to the first subsection of the green tubular structure into the reactor, wherein the first subsection is advanced out of the reactor and the second subsection is situated within the reactor volume;

maintaining the reactor at a temperature ranging from about 500° C. to about 3000° C. for the reaction time;

feeding at least one other subsection adjacent to the second subsection of the green tubular structure into the reactor, wherein the second subsection is advanced out of the reactor and the at least one other subsection is situated within the reactor volume; and, maintaining the reactor at a temperature ranging from about 500° C. to about 3000° C. for the reaction time.

14. The method of claim 13, wherein the method further comprises packing a solid gas source within the external volume, within the internal volume, or within both the external volume and the internal volume prior to feeding the green tubular structure into the reactor.

* * * * *

UNITED STATES PATENT AND TRADEMARK OFFICE
Certificate

Patent No. 8,343,449 B1

Patented: January 1, 2013

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Jason Schmitt, Wichita, KS (US); and Peng Lu, Wichita, KS (US).

Signed and Sealed this Thirty-first Day of December 2013.

MELVIN C. MAYES
*Supervisory Patent Examiner*
Art Unit 1732
Technology Center 1700